United States Patent [19]

Abbes et al.

[11] Patent Number: 4,603,892
[45] Date of Patent: Aug. 5, 1986

[54] TIGHT CONNECTION DEVICE

[75] Inventors: Claude Abbes, St. Etienne; Raymond De Villepoix, Donzére; Christian Rouaud, Bourg St. Andeol, all of France

[73] Assignee: Commissariat a l'Energie Atomique, Paris, France

[21] Appl. No.: 714,264

[22] Filed: Mar. 21, 1985

[30] Foreign Application Priority Data

Apr. 5, 1984 [FR] France .............................. 84 05380

[51] Int. Cl.$^4$ .............................................. F16L 17/06
[52] U.S. Cl. .................................... 285/336; 285/351; 285/363; 285/917; 277/236
[58] Field of Search ....... 285/336, 349, 363, DIG. 18, 285/318, 351; 277/236, 167.5

[56] References Cited

U.S. PATENT DOCUMENTS

| | | | |
|---|---|---|---|
| 1,873,855 | 8/1932 | Wilson | 285/336 X |
| 1,985,475 | 12/1934 | Victor | 288/1 |
| 2,291,709 | 8/1942 | Goetze | 285/137 |
| 2,422,009 | 6/1947 | Goetze | 285/336 X |
| 2,898,000 | 8/1959 | Hanny | 285/336 X |
| 3,313,553 | 4/1967 | Gastineau | 277/236 X |
| 3,820,799 | 6/1974 | Abbes et al. | 277/236 X |
| 3,917,294 | 11/1975 | Abbes et al. | 277/236 X |
| 4,452,462 | 6/1984 | Karr | 277/167.5 X |

FOREIGN PATENT DOCUMENTS

| | | |
|---|---|---|
| 993123 | 10/1951 | France . |
| 1583060 | 10/1969 | France . |
| 2232235 | 12/1974 | France . |

*Primary Examiner*—Dave W. Arola
*Attorney, Agent, or Firm*—Oblon, Fisher, Spivak, McClelland & Maier

[57] ABSTRACT

This invention relates to a tight connection device comprising a flexible metal joint. The joint, located in two trapezoidal grooves formed in two flanges, has in the rest condition an oval section, whereof one of the axes of symmetry is located in the plane of symmetry of the joints. The joint is in tight contact with the sides of the groove in four zones and, after securing the tie rods, is in contact with the bottom of the grooves in two zones.

13 Claims, 8 Drawing Figures

TIGHT CONNECTION DEVICE

FIELD OF THE INVENTION

The present invention relates to a tight connection device, particularly between two pipes or between a container and its cover, of the type having a flexible metal joint placed between two facing flanges, connected by fastening means, the flexible metal joints having an annular hollow metal core and at least one envelope, in which is fitted or embedded said metal core.

BACKGROUND OF THE INVENTION

In the metal joints used in such devices, the elastic metal core is constituted either by a metal tube, or by a helical spring with continguous turns and closed on itself. In the latter case, the cross-section of the wire forming the spring can have numerous different shapes and in particular can be circular, rectangular or in circular segment form. The helical spring or tube, which is fastened on the edges, gives the joint its elasticity.

The envelope or envelopes surrounding the core of said joints are made from plastic materials or thin sheets from materials such as polytetrafluoroethylene, aluminium, silver, copper, nickel, tantalum, stainless steel, zirconium, etc.

When the flexible metal joints have several envelopes, each of the latter has its own particular function. Thus, when the core of the joint is constituted by a spring having contiguous turns, the inner envelope generally has a low distribution function at each turn apex of the elastic core. The outer envelope is made from a ductile metal so that, as a result of its creep characteristics in the roughnesses of the contacting surfaces, it gives the joint a perfect seal when it is secured in an assembly. In general terms, the plastic properties of the materials forming the same characterize the envelopes of the joint.

It is also pointed out that existing metal joints generally have a toroidal shape, whilst the envelopes surrounding the elastic core or web are also toroidal and the generator circle is not closed on itself. It can be a torus, if the joint is circular. However, the joint can have any other shape and in particular can be rectangular, oval, square, etc.

An illustration of an existing metal joint, whose elastic core is constituted by a helical spring with contiguous turns, is provided by FR-A-2,232,235.

These joints are generally used in assemblies constituted by two flat flanges or which have a groove with a rectangular section serving to receive the joint. Under these conditions, the behaviour of existing metal joints is perfectly satisfactory.

However, as is more particularly illustrated by FR-A-1,583,060, there are certain applications, particularly petrochemical applications, where the joints also must be placed in grooves having a trapezoidal section and formed in facing flanges. In this case, the joints must ensure both the tightness between the flanges and the relative centering between the latter. Moreover, the operating conditions are generally very difficult, particularly with regards to the very high temperatures and pressures.

The use within such assemblies of existing flexible metal joints with a circular section is not particularly satisfactory, particularly due to the relatively great depth of the grooves as compared with their width.

Furthermore, U.S. Pat. No. 1,985,475 discloses a flexible metal joint with an oval cross-section, which is more particularly designed for withstanding the high pressure prevailing in internal combustion engines.

However, it is not easy to use such a joint in an assembly of the type described in FR-A-1,583,060. Thus, if certain conditions revealed by the said specification are not respected, the fastening of the assembly leads to sliding and flattening of the envelopes surrounding the core or web of the joint. As a result, the oval of the joint is deformed, so that the joint is weakened and cannot be reused.

SUMMARY OF THE INVENTION

The present invention relates to a tight connection device having a flexible metal joint with an oval section, which is placed in grooves having a trapezoidal section and which face one another. This joint does not have the disadvantages referred to hereinbefore and leads to the advantages provided by existing flexible metal joints.

The present invention therefore proposes a tight connecting device incorporating a flexible metal joint placed between two facing flanges connected by fastening means, the joint comprising at least one annular hollow elastic metal core and at least one envelope in which the metal core is embedded, wherein the metal core of the joint has an oval cross-section in the rest state, whereof one of the axes of symmetry is located in the plane of symmetry of the joint, the flanges having at least two facing trapezoidal grooves, in which the joint is located so as to be in tight contact with the sides of said groove in four zones, whilst abutting with the base of said grooves in two zones, when the fastening means are actuated.

Preferably, prior to the actuation of the fastening means, the joint is spaced from the bottom of each of the said grooves by a distance between 0.5 and 1 mm.

According to two possible constructional variants of the invention, the axis of symmetry of the oval formed in section by the metal core of the joint and located in the plane of symmetry thereof can either be the minor axis or the major axis of the oval.

According to a special embodiment of the invention, the joint also comprises a solid annular locking ring arranged within the elastic core and which acts as a crushing limiter and/or a metal reinforcement.

Apart from assemblies with one sealing line, the invention also relates to assemblies with two sealing lines, in which at least one of the envelopes of the joint is extended parallel to the plane of symmetry of the joint, in order to support a second elastic core, which can either be a metal core identical to the first, or a non-metallic, e.g. elastomeric joint.

BRIEF DESCRIPTION OF THE DRAWINGS

The invention is described in greater detail hereinafter relative to non-limitative embodiments and the attached drawings.

DETAILED DESCRIPTION OF THE PREFERRED EMBODIMENTS

Figure 1:
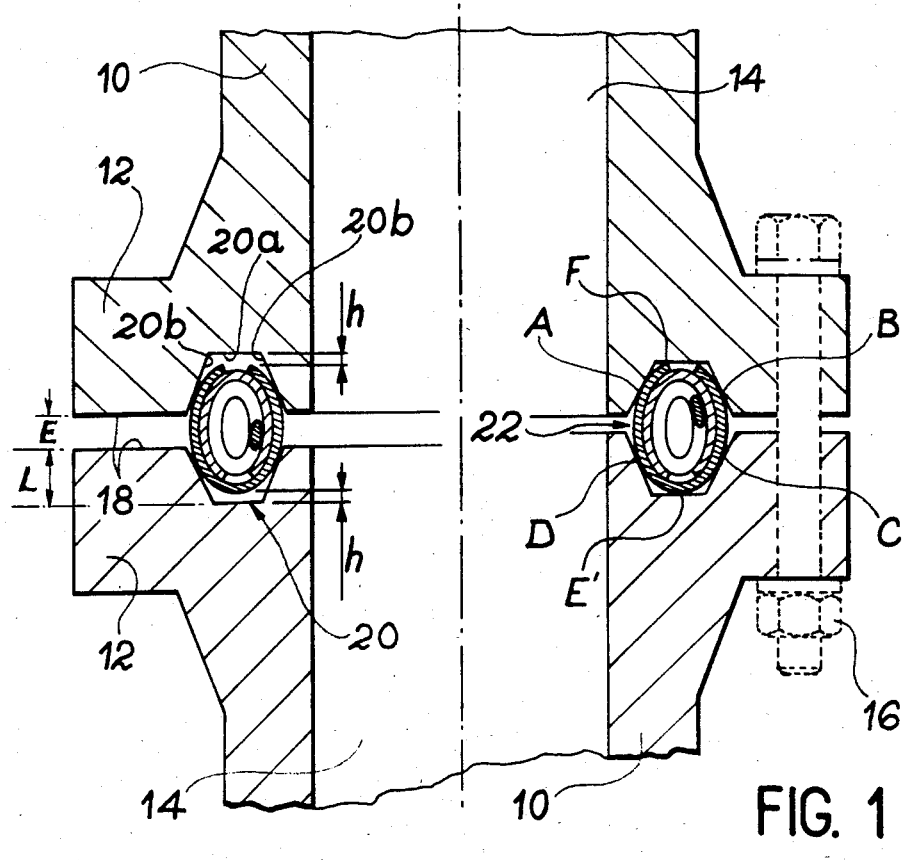
FIG. 1 is a longitudinal sectional view showing a tight connection device or assembly which, according to the invention, comprises a flexible metal joint with an oval section located in two facing trapezoidal grooves, said device being shown prior to its fastening in the left-hand half of the drawing and after fastening in the right-hand half.
Figure 2:
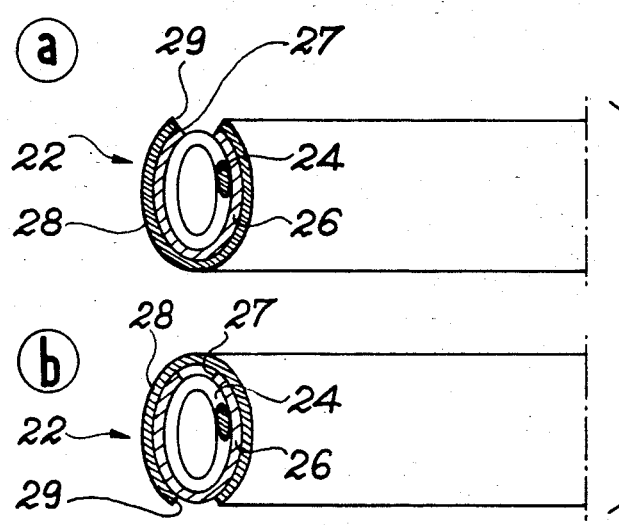
FIGS. 2a and 2b are diametral section half-views of the flexible metal joint illustrating two variants of a first embodiment according to the invention, in which the envelopes of the joint are open along the major axis of the oval defined in section by the joint.
Figure 3:
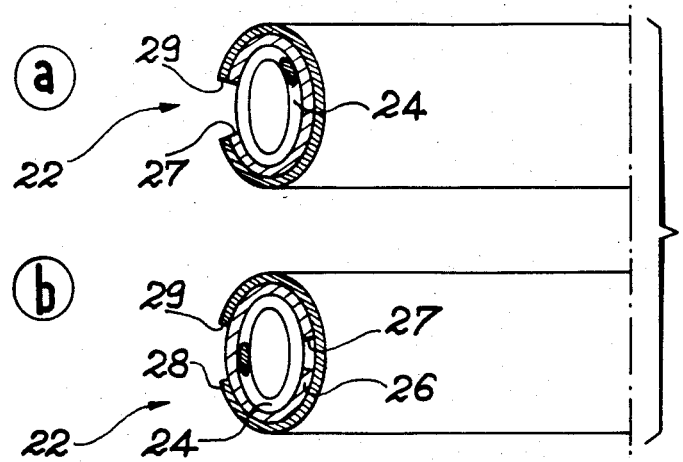
FIGS. 3a and 3b are views comparable to FIGS. 2a and 2b illustrating two variants of a second embodiment of the invention, in which the envelopes of the joint are open along the minor axis of the oval defined in section by the joint.

The assembly shown in FIG. 1, which constitutes a tight connection device according to the invention, comprises two facing flanges 12 welded to the ends of two pipes 10 to be connected, in such a way that the passages 14 defined by each of the pipes are axially aligned. The actual assembly is e.g., brought about with the aid of tie bolts 16, which pass through hole circumferentially distributed over each of the flanges 12. Obviously, any other fixing and fastening means can be used in place of the tie bolts 16.

On their facing faces 18, each of the flanges 12 has a groove 20 with a trapezoidal section surrounding the passage 14. Reference numeral 20a designates the bottom of the groove, and reference numeral 20b designates the sides thereof.

A flexible metal joint 22 having an oval section is placed in the facing grooves 20 and is secured between the flanges 12 by the tie bolts 16.

One of the axes (the minor axis in the drawing) of the oval defined in section by the joint 22 is located in the plane of symmetry of the joint (perpendicular to the common axis of the passages 14), whilst the other is perpendicular to said plane.

The oval shape of the joint 22 in section, as well as the dimensions of this oval, are chosen as a function of the shape and dimensions of the trapezoidal grooves 20, in such a way that the tightness of the assembly is brought about at four pseudo-punctiform zones designated by references A, B, C and D in FIG. 1. More specifically, these zones A, B, C and D are located on the sides 20b of the grooves 20, so that the tangents to the outer surface of the joint 22 has an orientation substantially equal to that of the inclined sides 20b of the grooves 20.

Prior to the fastening of the tie bolts 16 (cf the left-hand half of FIG. 1), the relative dimensions of the joint 22 and the grooves 20 are such that the distance h separating the joint 22 from the bottom 20a of each of the grooves 20 is between 0.5 and 1 mm when the joint 22 first comes into contact with the sides 20b of the grooves 20.

If E is the spacing between the flanges 12 before fastening and L is the depth of each groove 20, the major axis B' of the oval formed in section by the joint 22 can be calculated with the aid of the following formula:

$$B = E + 2L - 2h$$

Following the fastening of the tie bolts 16 (cf right-hand half of FIG. 1), the tightness of the assembly is brought about at the four zones A, B, C and D. However, to these four contact zones between the joint and the sides of the grooves are added two zones E' and F in FIG. 1, at which the joint 22 is in contact with the bottom 20a of the grooves 20. Bearing in mind the configuration of the joint 22, zones E and F are not necessarily sealing zones.

As a result of the arrangements described hereinbefore, the possible sliding at the four zones A, B, C and D between the joint 22 and the sides 20b of the grooves 22 during the fastening and prior to contact at E' and F is limited to a few tenths of a millimeter, so that the effectiveness of the joint is maintained.

A more detailed description will now be given of various possible embodiments of the joint 22, with reference to FIGS. 2 to 6.

In a conventional manner for a flexible metal joint of this type, the joint 22 comprises a core or web constituted by a metal helical spring 24 having contiguous turns and closed on itself. This spring is embedded in a first envelope 26, which is itself fitted into a second envelope 28, which forms the outer envelope of the joint.

According to the invention, the oval shape of the joint 22 in section is obtained by giving an oval shape to the spring 24 forming the joint core.

The envelopes 26 and 28 are then placed respectively on the spring 24 and on the envelope 26.

In the embodiment of FIG. 2a, as in the embodiments illustrated in FIGS. 2b, 3a, 3b, 4 and 5, the minor axis of the oval formed in section by the joint is located in the radial plane of symmetry thereof, whilst the major axis of the oval is perpendicular to said plane and consequently parallel to the axis of the joint 22 when the latter is of revolution. In a conventional manner for flexible metal joints, the envelopes 26 and 28 are open at 27 and 29.

In a more general manner, in FIGS. 2a and 2b, the two envelopes are open at 27 and 29 along the major axis of the oval defined in section by the joint 22. The variant of FIG. 2a differs from that of FIG. 2b by the fact that in FIG. 2a envelopes 26 and 28 are both open on the same side of the joint, whereas they are open on two opposite sides in the case of FIG. 2b.

FIGS. 3a and 3b illustrate two constructional variants of the joint according to the invention, in which the envelopes 26 and 28 are open at 27 and 29 along the minor axis of the oval defined in section by the joint 22. More specifically, FIG. 3a illustrates the case where the two envelopes 26 and 28 are open along the outer periphery of the joint, whereas FIG. 3b illustrates the case where the two envelopes are open along the inner and outer peripheries of the joint respectively.

Figure 4:
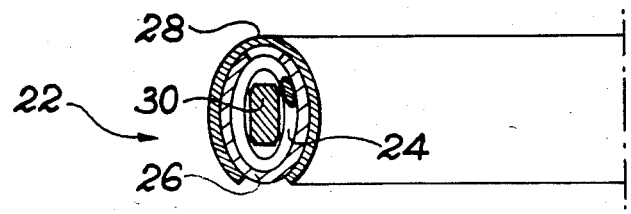
FIG. 4 is a view comparable to FIGS. 2 and 3 illustrating another embodiment of the invention, in which a solid annular locking ring is placed within the elastic core or web of the joint.

FIG. 4 shows another embodiment of the invention, in which the joint 22 also has, within the helical spring 24 with contiguous turns, a solid locking ring 30 which, in FIG. 4, has a substantially rectangular cross-section with bevelled edges and which can be used as a joint crushing limiter and/or as a metal reinforcement for the joint 22.

FIG. 4 shows the case where a locking ring 30 is placed in a joint identical to that of FIG. 2b. However, this is clearly only a non-limitative embodiment. It is clear that a solid locking ring 30 could also be placed in the joints 22 shown in FIGS. 2a, 3a and 3b.

Figure 5:
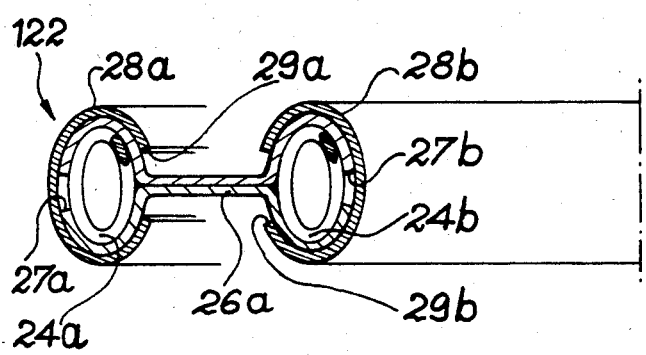
FIG. 5 is a view comparable to FIGS. 2 to 4 illustrating another embodiment of the invention, in which the joint has two sealing lines.

Obviously, the invention is not limited to devices having a single sealing line and also covers devices having two sealing lines. Thus, in exemplified manner in FIG. 5 is shown a joint 122 having two closed helical springs 24a, 24b with contiguous turns and an oval section and with a common plane of symmetry containing the minor axes of the ovals defined in section by each of the springs. A spacer 26a is placed between the springs 24a, 24b along said plane of symmetry and constitutes at the same time the first envelope of each of the springs. This first envelope opens at 27b along the inner periphery of the inner spring 24b and at 27a along the outer periphery of the outer spring 24a. Moreover, a second envelope 28a, 28b is placed on that part of the spacer 26a respectively enveloping springs 24a and 24b. Envelopes 28a, 28b open so as to face one another, i.e. at 29a according to the inner periphery of the spring 24a for the envelope 28a and at 29b according to the outer periphery of the spring 24b for the envelope 28b.

Obviously, the description of joint 122 given hereinbefore with reference to FIG. 5 is in no way limitative, and it is clear that the invention also covers a joint with two sealing lines with at least one flexible metal joint and having an oval section. In particular, the different embodiments of FIGS. 2 to 4 can be used for modifying the joint of FIG. 5. Moreover, it should be noted that one of the two sealing lines of the joints can be realised with the aid of a non-metallic joint and particularly an elastomeric joint.

Obviously, the joint 122 with two sealing lines according to FIG. 5 is placed in an assembly with two flanges, each having two grooves with a trapezoidal section able to receive the two parts of the joint 122.

Figure 6:
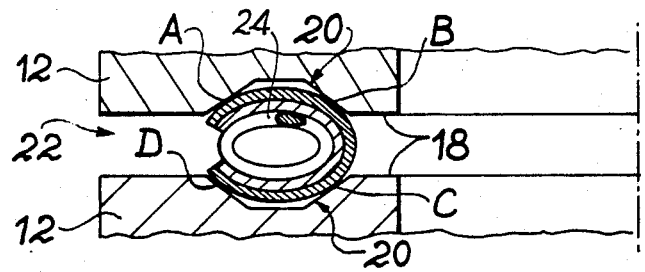
FIG. 6 is a partial half-sectional view of a tight connecting device according to the invention having a joint, in which the major axis of the oval formed in section by the joint is located in the plane of symmetry thereof.

Finally, FIG. 6 shows in exemplified manner another possible embodiment of the device according to the invention which differs from the previous embodiments in that, in this case, the major axis of the oval which the joint has in section is contained in the plane of symmetry thereof. As illustrated in FIG. 6, such a joint is particularly appropriate for the case where the trapezoidal grooves 20 formed in the flanges 12 are wider and have a reduced width. Here again, the four contact zones A, B, C and D between the joint 22 and the sides 20b of the grooves 20 are such that at this point the tangents to the outer surface of the joint 22 have directions which are substantially identical to those of the sides of the trapezoidal grooves 20. Moreover, the distance h separating joint 22 from the bottom of grooves 20 prior to fastening is between 0.5 and 1 mm, so that the effect of fastening the assembly is to bring the joint into contact with the bottoms of the grooves without any significant deformation of the joint 22.

All the embodiments described with reference to FIGS. 2 to 5 also apply to the embodiment of FIG. 6. In particular, the opening of the envelopes 26 of the joint 22 can take place in any of the ways described with reference to FIGS. 2 and 3, a solid locking ring 30 can be placed within the helical spring 24 according to FIG. 4 and such a joint can also make it possible to provide two sealing lines, as described relative to FIG. 5.

Obviously, all the known variants of existing flexible metal joints can be advantageously applied to the flexible metal joints used in the device according to the invention. Thus, little significance is attached to whether the joint has one or several envelopes surrounding the elastic metal core, whilst the latter can also differ from the helical spring described and it can in particular be in the form of a metal tube. Furthermore, the joint according to the invention can have a random shape in plan view i.e., it can be circular, rectangular, substantially square, etc without passing beyond the scope of the invention.

What is claimed is:

1. A tight connecting assembly comprising:
   (a) two flanges having opposing faces and opposing grooves in said opposing faces, each one of said opposing grooves being trapezoidal in cross-section and having a bottom and two sides;
   (b) means for fastening said two flanges together; and
   (c) a flexible joint disposed in said opposing grooves, said flexible joint comprising:
      (i) at least one annular hollow elastic metal core, said at least one annular hollow elastic metal core having an oral cross-section in its rest state, said oval cross-section having a major axis and a minor axis, one of said axes being located in the plane of symmetry of said flexible joint, and
      (ii) at least one flexible envelope surrounding said at least one annular hollow elastic metal core except for an opening located on one of said axes of said oval cross-section,
   said flexible joint being sized, shaped, and positioned so that, when said tight connecting assembly is assembled, said flexible joint is in tight contact with said two sides of each of said opposing grooves and abuts said bottom of each of said opposing grooves.

2. An assembly as recited in claim 1 wherein said opposing grooves and said flexible joint are sized and shaped so that, when said joint first comes into contact with said two sides of each of said opposing grooves, said joint is spaced from said bottom of each of said opposing grooves by a distance of between 0.5 mm and 1 mm.

3. An assembly as recited in claim 1 wherein said one of said axes that is located in the plane of symmetry of said flexible joint is the minor axis of said oval cross-section.

4. An assembly as recited in claim 1 wherein said one of said axes that is located in the plane of symmetry of said flexible joint is the major axis of said oval cross-section.

5. An assembly as recited in claim 1 wherein said flexible joint further comprises a solid annular locking ring disposed within said at least one annular hollow elastic metal core.

6. An assembly as recited in claim 1 wherein:
   (a) each one of said opposing flanges has two opposing grooves in said opposing faces and each one of said opposing grooves is trapezoidal in cross-section and has a bottom and two sides;
   (b) said flexible joint comprises two annular hollow elastic metal cores;
   (c) said at least one flexible envelope surrounds both of said two annular hollow elastic metal cores and joins said two annular hollow elastic metal cores in the plane of symmetry of said flexible joint; and
   (d) said flexible joint is sized, shaped, and positioned so that, when said tight connecting assembly is assembled, said flexible joint is in tight contact with said two sides of each of said two opposing grooves in each of said two opposing flanges and abuts said bottom of each of said two opposing grooves in each of said two opposing flanges.

7. An assembly as recited in claim 1 wherein said at least one annular hollow elastic metal core is a helical spring.

8. An assembly as recited in claim 1 wherein said at least one flexible envelope is surrounded by a second flexible envelope.

9. An assembly as recited in claim 8 wherein said at least one flexible envelope and said second flexible envelope both have openings facing the same direction.

10. An assembly as recited in claim 8 wherein said at least one flexible envelope and said second flexible envelope have openings facing in the opposite directions.

11. An assembly as recited in claim 8 wherein said at least one flexible envelope and said second flexible envelope both have an opening located on the one of said axes that is located in the plane of symmetry of said flexible joint.

12. An assembly as recited in claim 8 wherein said at least one flexible envelope and said second flexible envelope both have an opening located on the one of said axes that is not located in the plane of symmetry of said flexible joint.

13. An assembly as recited in claim 1 wherein said at least one flexible envelope is made from a plastic material or thin sheets of material selected from the group consisting of polytetrafluoroethylene, aluminum, silver, copper, nickel, tantalum, stainless steel, and zirconium.

* * * * *